United States Patent [19]
Norton, Jr.

[11] Patent Number: 5,388,010
[45] Date of Patent: Feb. 7, 1995

[54] PEAK DETECTOR FOR DETECTING ACCURATE PULSE PEAKS PRODUCED BY A MAGNETIC HEAD EXHIBITING RESIDUAL MAGNETISM

[75] Inventor: David E. Norton, Jr., Boulder, Colo.

[73] Assignee: Fujitsu Limited, Kawasaki, Japan

[21] Appl. No.: 166,596

[22] Filed: Dec. 13, 1993

Related U.S. Application Data

[63] Continuation of Ser. No. 769,405, Oct. 1, 1991, abandoned.

[51] Int. Cl.[6] .................. G11B 5/09; G11B 5/596
[52] U.S. Cl. ...................... 360/46; 360/77.08
[58] Field of Search ............... 360/46, 65, 75, 77.01, 360/77.02, 77.08

[56] References Cited

U.S. PATENT DOCUMENTS

| | | | |
|---|---|---|---|
| 3,959,820 | 5/1976 | Braun | 360/77.02 |
| 4,380,034 | 4/1983 | Krake | 360/77.02 |
| 4,477,849 | 10/1984 | Berger | 360/77.02 |
| 4,647,992 | 3/1987 | Vinal | 360/77.01 |
| 5,153,789 | 10/1992 | Sidman | 360/77.08 |

Primary Examiner—Donald Hajec
Assistant Examiner—Won Tae C. Kim
Attorney, Agent, or Firm—Curtis, Morris & Safford

[57] ABSTRACT

A peak detector for detecting accurate peaks of pulses recovered from a magnetic disk in the presence of residual magnetism by a magnetic head, but without the deleterious effects of such residual magnetism. The head supplies differential pulses as respective pulse trains to first and second peak detectors, respectively. The peaks detected in the first train of differential pulses are combined with the peaks detected in the second train, and an output signal produced as a function of the combined peaks is indicative of the pulse peaks. The respective peaks, which represent the positive and negative peaks of the pulses, are compared to a set of reference levels and, depending upon the relationship of those peaks with the reference levels, a gain error or an offset error is indicated. If the positive pulse peaks and negative pulse peaks exhibit substantially similar relationships with respect to the reference levels, a gain error is indicated. However, if the positive pulse peaks and negative pulse peaks exhibit dissimilar relationships with respect to the reference levels, an offset error is indicated.

19 Claims, 5 Drawing Sheets

PEAK DETECTOR FOR DETECTING ACCURATE PULSE PEAKS PRODUCED BY A MAGNETIC HEAD EXHIBITING RESIDUAL MAGNETISM

This application is a continuation of application Ser. No. 07/769,405, filed Oct. 1, 1991 abandoned.

BACKGROUND OF THE INVENTION

This invention relates to pulse detection and, more particularly, to a pulse detector which accurately detects pulses read from a magnetic disk by a magnetic head which may exhibit residual magnetism. The invention also relates to a discriminator which uses the detected pulses to discriminate between offset errors and gain errors in the pulse detecting channel.

In conventional hard disk drives, servo information typically is recorded for the purpose of maintaining the head or heads of the drive in accurate registration with a track being scanned. In earlier hard disk drives comprised of multiple disks, it was conventional to dedicate the entire surface of one disk to servo information; and a separate servo head was used to read that information from which positional, or tracking errors were detected. A closed loop feedback arrangement adjusted the servo head relative to the servo tracks being scanned thereby so as to correct for tracking errors. Since the servo head was included in a stack of heads, tracking error correction of the servo head resulted in tracking error correction of all of the heads.

More recently, servo information has been disposed in limited portions of each track on each disk surface; and the same head normally used to read or write useful data is used to read this servo information. Typically, a servo pattern is recorded in a sector header, with headers being disposed uniformly in each track. Although various types of servo patterns have been proposed, their primary objective is to produce a signal which represents the magnitude and direction of a tracking error. One type of servo pattern produces a pair of positive pulses of intermediate amplitude followed by a single negative pulse of large magnitude when scanned. If the head drifts to one side of the track, the amplitude of one of the positive pulses exceeds the amplitude of the other, and the amplitude of the negative pulse is reduced. Hence, the direction of the tracking error is detected as a function of which positive pulse amplitude increased, and the amount of this error is detected as a function of the difference between the peaks of the positive pulses.

Another type of servo pattern is formed as two (or more) bursts of magnetic domains, both offset from the center of the track in opposite directions. Because of this equal offset, when the head is centered on the track, the pulses derived from one burst will be of equal amplitude to the pulses derived from the other burst. If the head drifts to one side of the track, the pulse amplitudes derived from one burst will be greater than the pulse amplitudes derived from the other. Thus, by determining which of the bursts results in greater pulse amplitudes, the direction of the tracking error is detected. Similarly, the magnitude of this tracking error is sensed as a function of the difference between those pulse amplitudes. Typically, amplitudes of the pulses derived from the bursts are sensed by peak detection. Since each magnetic domain results in a pulse pair, one being positive-going and the other being negative-going, the pulses first are full-wave rectified and then these full-wave rectified pulses are detected.

In the foregoing peak detection arrangement, it is expected that the positive excursions above a base line (or AC reference level) produced when a burst of magnetic domains is scanned is equal to the negative excursions below that base line. However, it has been found in practice that the head which reads the servo pattern may exhibit residual magnetism. As a result, the positive excursions above the base line differ from the negative excursions below. This residual magnetism may be thought of as a bias on one side of the head gap but not the other, and may be produced during a data write operation. Data normally is written on a track until a servo pattern is reached, whereafter the same head is changed over to its read mode to sense the servo pattern for the purpose of error correction. During this write-to-read transition, residual magnetization may remain as a function of the direction that flux last passed through the head, that is, the direction of the flux used to write the last piece of data.

As a result of this residual magnetization, the base line of the pulses derived from one burst is shifted, but a similar shift is not present in the pulses derived from the other burst. Because of the offset in the bursts, the residual magnetism at one end of the gap will have the effect of biasing the base line of the pulses derived from the burst that is offset in the direction of that end. A similar bias effect is not present in the pulses derived from the burst that is offset in the direction of the other end of the gap. Consequently, when the pulses are full-wave rectified, prior to detecting their peaks, as is conventional, the peaks detected from the pulses that have been biased above (or below) the base line will be greater than the peaks which are detected from the pulses that have not been so biased. Thus, even though the head may be centered accurately on a track, the peak voltage level detected from the pulses derived from one burst will differ from the peak voltage that is detected from the pulses derived from the other burst. This peak differential is interpreted erroneously as a tracking error. Hence, even though the head is in proper registration with a track, a "correction" will be made, with the result that the head now will be shifted into misregistration. This occurrence, which typically follows a write-to-read transition, is referred to as Write Induced Position Error, or WIPE.

Another difficulty encountered in typical disk drive operations is the general inability of a typical pulse detecting channel to discriminate between offset errors and gain errors. An offset error is produced when the preamplifier circuit normally included in the write channel, having been heated by a write current when writing data, generates an output offset different from that from the immediately preceding read operation. This new offset then is coupled into the read channel by a high pass filter. As a result, the pulses produced by the read channel exhibit a corresponding shift either upwardly or downwardly, depending upon the direction in which the offset is generated.

At a write-to-read transition, as when the servo pattern is sensed following a write operation, the gain of the playback amplifiers, and more particularly, the gain of the read channel, may need adjustment. For example, at the beginning of the servo pattern, the gain of the read channel may be too high and automatic gain control (AGC) operates to adjust this gain to its proper level. Conversely, if the gain of the read channel is too low at the beginning of the servo pattern, AGC operation increases the gain to its proper level.

The envelope of the pulses derived from, for example, the offset servo bursts, is used to detect both offset and gain errors. However, when the pulses are full-wave rectified, it often is difficult, if not impossible, to discriminate between gain and offset errors. Consequently, the proper corrective operation is not easily implemented.

OBJECTS OF THE INVENTION

Therefore, it is an object of the present invention to provide an improved pulse peak detector which overcomes the aforenoted disadvantages of prior art peak detectors which use full-wave rectification.

Another object of this invention is to provide an improved discriminator which readily discriminates between offset and gain errors in a read channel.

A further object of this invention is to provide an improved pulse peak detector which is not influenced by residual magnetism in the read/write head.

An additional object of the present invention is to provide an improved pulse detector for use in AGC level detection as well as for servo position detection.

Various other objects, advantages and features of the present invention will become readily apparent from the ensuing detailed description, and the novel features will be particularly pointed out in the appended claims.

SUMMARY OF THE INVENTION

In accordance with one aspect of this invention, apparatus is provided for peak detecting pulses recovered from a magnetic disk by a magnetic head which may exhibit residual magnetism. Differential pulses recovered by the head are supplied as first and second pulse trains to first and second peak detectors, respectively. The peaks detected in the first train of differential pulses are combined with the peaks detected in the second train; and an output signal indicative of the pulse peak is produced as a function of the combined peaks.

As a feature of this aspect, a combining circuit is used to average the peaks detected in both trains of differential pulses. The combining circuit preferably comprises a summing circuit.

As another feature of this aspect, each peak detector is comprised of a differential amplifier supplied with both trains of differential pulses. A capacitor stores an output voltage produced by the differential amplifier, whereby the capacitor of one peak detector stores peaks of, for example, noninverted pulses and the capacitor of the other peak detector stores peaks of inverted pulses. Advantageously, a differential head produces the two trains of differential pulses as inverted and noninverted pulses, respectively.

As yet a further feature of this aspect, each peak detector includes a reset circuit for resetting the capacitor therein. The capacitor which stores peaks of the noninverted pulses is reset in response to the next noninverted pulse before being charged to the level of this next-following non-inverted pulse and, similarly, the capacitor which stores peaks of the inverted pulses is reset in response to the next inverted pulse before being charged to the level of this next-following inverted pulse. This is achieved by operating one reset switch in response to an inverted pulse and operating another reset switch in response to a noninverted pulse.

As another aspect of this invention, apparatus is provided for discriminating between offset errors and gain errors in a pulse detecting, or read, channel of a disk drive. First and second peak detectors, preferably of the aforementioned type, detect positive and negative peaks, respectively, of pulses that are detected from the disk drive. A comparison circuit compares the positive and negative peaks to a set of reference levels, and a gain error is indicated if the positive and negative peaks exhibit substantially similar relationships with respect to the reference levels, whereas an offset error is indicated if the positive and negative peaks exhibit dissimilar relationships with respect to the reference levels.

As a feature of this aspect, the reference levels comprise a relatively high reference level and a relatively low reference level. The comparator circuit compares the positive peaks to the high and low reference levels, respectively, and the negative peaks also are compared to the respective high and low reference levels. A gain error is indicated when the positive and negative peaks both exceed the high reference level or both are less than the low reference level; and an offset error is indicated when the positive (or negative) peaks exceed the high reference level and the negative (or positive) peaks are less than the low reference level.

As another feature of this aspect, the gain error is indicated by a first coincidence circuit which senses when the positive peaks and the negative peaks both exceed the high reference level and a second coincidence circuit which senses when the positive peaks and the negative peaks both are less than the low reference level. An offset error is indicated by a further coincidence circuit which senses when the positive peaks exceed one reference level and the negative peaks exceed the other.

BRIEF DESCRIPTION OF THE DRAWINGS

The following detailed description, given by way of example and not intended to limit the present invention solely thereto, will best be appreciated in conjunction with the accompanying drawings in which.

DETAILED DESCRIPTION OF PREFERRED EMBODIMENTS

Figure 1:
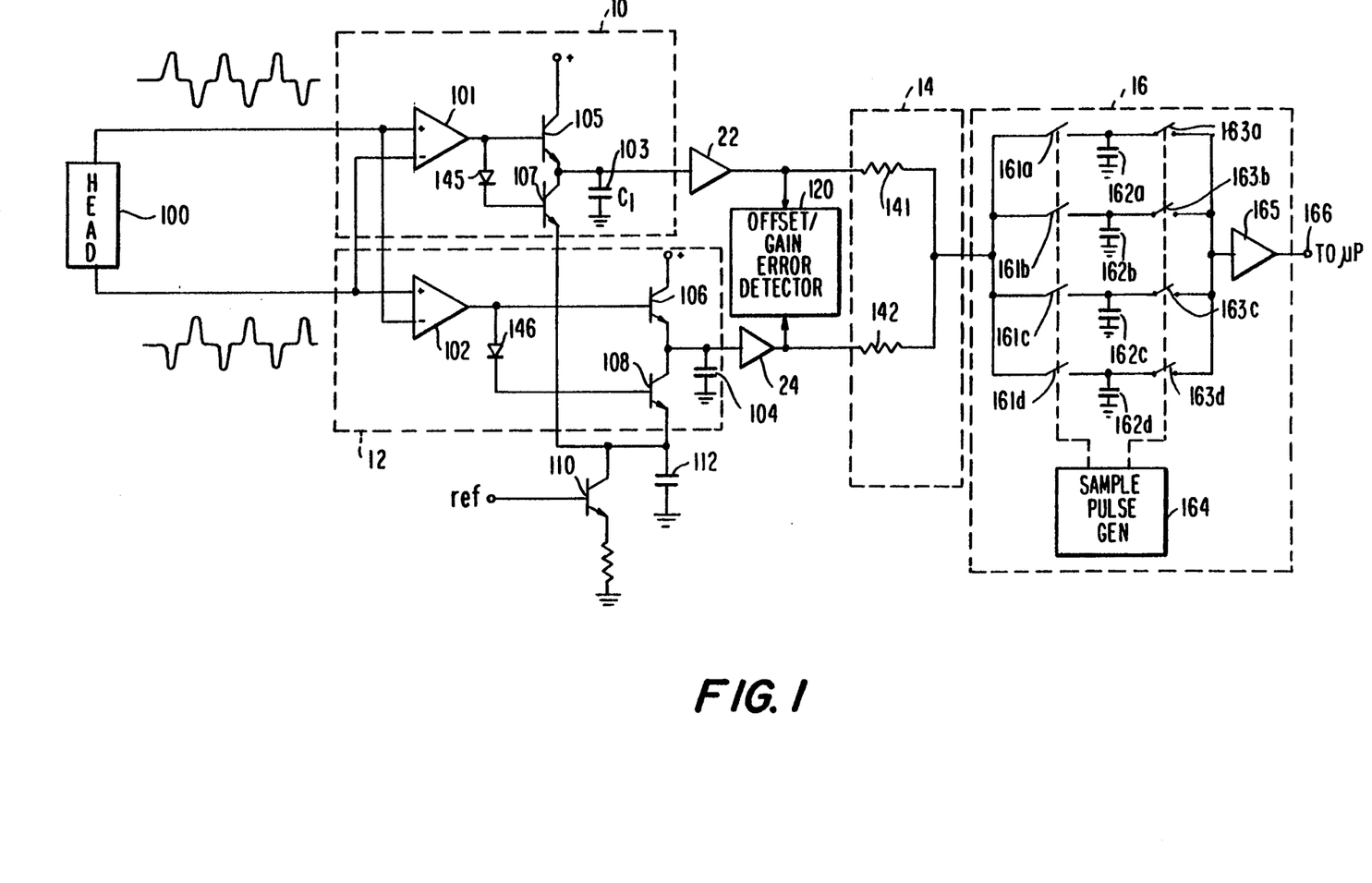
FIG. 1 is a schematic diagram of a preferred embodiment of a peak detector in accordance with the present invention.

Referring now to FIG. 1, there is illustrated a preferred embodiment of peak detecting apparatus in accordance with the present invention. The peak detecting apparatus is comprised of peak detectors 10 and 12, a combining circuit 14 and an output circuit 16. The peak detectors are supplied with differential pulses produced by a differential playback transducer, or head 100. A differential head normally is used to read or write information on a magnetic disk, such as a hard disk, and is adapted to produce two trains of pulses, one of which is an inverted version of the other. Typical waveforms of these differential pulses, including their respective relationships relative to each other also are illustrated in FIG. 1. It will be recognized that the positive and negative pulses in both trains are positive-going and negative-going with respect to a base line which may be considered an AC zero level. For convenience, the pulses supplied by head 100 to peak detector 10 are referred to as noninverted or positive pulses and the pulses supplied to peak detector 12 are referred to as inverted or negative pulses.

Peak detector 10 is comprised of a differential amplifier 101, a peak-hold capacitor 103 and a coupling transistor 105. The differential amplifier includes noninverting and inverting inputs across which the differential pulses are supplied. As illustrated, the noninverting input of differential amplifier 101 is coupled to head 100 to receive the noninverted pulses, and the inverting input of the differential amplifier is coupled to the head to receive the inverted pulses.

Transistor 105 is illustrated as an npn transistor whose base-emitter circuit couples the output of differential amplifier 101 to peak-hold capacitor 103. In this configuration, it will be appreciated that peak detector 10 functions to detect the positive peaks of the noninverted pulses supplied thereto by head 100.

Peak detector 12 is comprised of a differential amplifier 102, a peak-hold capacitor 104 and a transistor 106 for coupling the capacitor to the differential amplifier. It is seen that peak detector 12 is of substantially the same configuration as peak detector 10 and functions to detect the positive peaks of the inverted pulses supplied thereto by head 100.

Peak detector 10 also includes a reset circuit for resetting capacitor 103 before the detection of the next positive pulse in the noninverting pulse train. This reset circuit includes a transistor 107, whose collector-emitter circuit is connected in parallel across capacitor 103 and in series with a current source transistor 110, and a diode 145 poled to produce a forward bias voltage drop $V_{be}$ from the output of amplifier 101 to the base electrode of transistor 107.

A similar reset circuit is coupled to capacitor 104 in peak detector 12. Here, transistor 108 has its collector-emitter circuit connected in parallel with capacitor 104 and in series with current source 110. A diode 146 is poled to produce a forward bias voltage drop $V_{be}$ from the output of amplifier 102 to the base of transistor 108.

The reset circuits coupled to peak detectors 10 and 12 also include a delay capacitor 112 which is connected in parallel with current source 110 and, thus, is coupled to the respective emitters of transistors 107 and 108. It will be seen that the voltage across delay capacitor 112 establishes the emitter voltage of transistors 107 and 108, and as this voltage decays, the threshold level by which the transistors turn on to discharge capacitors 103 and 104 decreases. In one embodiment, delay capacitor 112 functions to reset capacitors 103 and 104 after a 1 microsecond delay in the absence of pulses supplied by head 100.

Before describing the remaining circuitry included in the peak detector apparatus, a brief description of the operation of the reset circuit is provided. Capacitor 112 is charged alternately through transistor 107 and then through transistor 108 in response to positive pulses produced by amplifier 101 and amplifier 102, respectively. In between these pulses, capacitor 112 discharges through current source 110. It is appreciated that when capacitor 103 stores a pulse peak voltage, the emitter of transistor 105 is back-biased and, thus, is not rendered conductive, or turned on, by a noninverted pulse supplied to its base by amplifier 101. However, transistor 107 is not back-biased (because capacitor 112 will have discharged through current source 110) and, therefore, it is turned on to discharge capacitor 103 therethrough to capacitor 112. Accordingly, capacitor 103 discharges rapidly to reduce the voltage at the emitter of transistor 105. When this voltage falls below the base voltage thereof, transistor 105 is turned on to charge capacitor 103 to the peak voltage of the pulse now produced at the output of amplifier 101. Hence, capacitor 103 is reset in response to the next-following non-inverted pulse before it is charged to the peak level of that non-inverted pulse. A similar reset operation is carried out to reset capacitor 104 in response to the next-following inverted pulse produced at the output of amplifier 102.

Combining circuit 14 is comprised of summing resistors 141 and 142 connected to capacitors 103 and 104 by buffers 22 and 24, respectively. These summing resistors function to sum the peak-held voltages across capacitors 103 and 104; and in the preferred embodiment, these resistors are of equal resistance values so as to average the peak-held voltages.

Output circuit 16 is adapted to sample the averaged peak-held voltages and to supply those samples to a microprocessor. If these samples are derived from servo pulses, the samples are used as tracking error signals for carrying out a servo-controlled error correcting operation. Tracking error signals normally take the form of "normal" signals N and "quadrature" signals Q. In implementing a tracking control operation, the microprocessor typically is provided with N, $\overline{N}$, Q and $\overline{Q}$ signals. Sampling circuit 16 operates to sample the averaged peak-held voltages so as to produce samples corresponding to these N, $\overline{N}$, Q and $\overline{Q}$ signals. Accordingly, the output circuit includes sampling switches 161a, 161b, 161c and 161d coupled to combining circuit 14 and operable at different sampling phases in response to sampling pulses supplied thereto by a sample pulse generator 164. The phases of these sample pulses correspond to the N, $\overline{N}$, Q and $\overline{O}$ signals.

The samples produced by the respective sampling switches are stored on capacitors 162a, 162b, 162c and 162d, respectively. These capacitors operate as hold capacitors; and it is seen that the combination of sampling switches 161 with hold capacitors 162 comprise sample-and-hold circuits. In addition, and advantageously, the combination of hold capacitors 162 and summing resistors 141, 142 functions as a low pass filter to band limit noise. Read-out switches 163a, 163b, 163c and 163d are coupled to hold capacitors 162a, 162b, 162c and 162d, respectively, and these read-out switches operate in timed relationship in response to sample pulses supplied thereto by the sample pulse generator. These read-out switches operate one-at-a-time to supply a serial stream of peak-held samples N, $\overline{N}$, Q and $\overline{Q}$ which are coupled to an output terminal 166 by a buffer amplifier 165, from which the samples are supplied to the microprocessor (not shown).

Figure 2A:
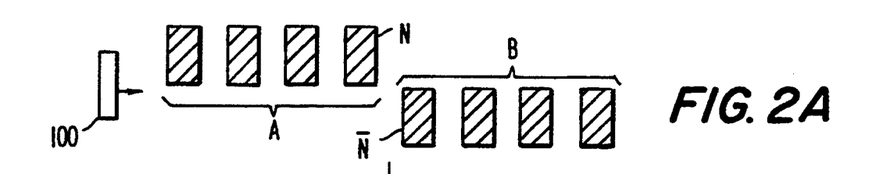
FIGS. 2A-2H are waveform diagrams which are useful in understanding the operation of the peak detector shown in FIG. 1.

The manner in which the peak detector circuitry shown in FIG. 1 operates to produce an accurate representation of pulse peaks, notwithstanding the presence of residual magnetism in head 100, now will be described in conjunction with the waveform diagrams of FIGS. 2A–2H. For convenience, this operation is described with reference to reproducing servo pulses; and these waveform diagrams result from an accurate registration of head 100 relative to the track in which the servo pattern is recorded. FIG. 2A illustrates this servo pattern as a burst of magnetic domains A comprising normal signals N followed by a burst of magnetic domains B comprising normal signals N̄, these bursts being offset relative to the center line of the track, first to one side and then to the other. A tracking error is detected by comparing the peaks of the pulses produced in response to scanning burst A to the peaks produced in response to scanning burst B. A similar pattern of quadrature bursts also may be provided; but for ease of understanding the present invention, further description of these quadrature bursts is not needed and not provided. Ideally, when head 100 is in proper registration with the illustrated track, these two sets of peaks, that is, the peaks produced when burst A is scanned and the peaks produced when burst B is scanned, are equal.

Figure 2B:
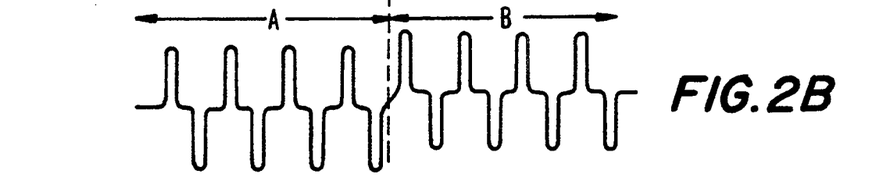

FIG. 2B illustrates the pulses produced when bursts A and B are scanned by a read/write head having residual magnetism. It is assumed that this residual magnetism is such that the base line of the pulses produced when burst A is scanned is effectively shifted in the downward direction relative to the base line when burst B is scanned. Thus, although the positive and negative excursions of the pulses produced when burst A is scanned are equal to each other and are also equal to the positive and negative excursions of the pulses produced when burst B is scanned, it is seen that the positive peaks of the burst A pulses are less than the positive peaks of the burst B pulses.

Figure 2C:
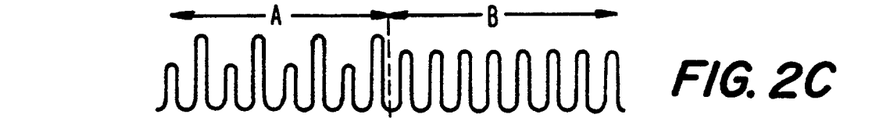

In the prior art, the pulses shown in FIG. 2B are full-wave rectified, resulting in the positive-going pulses of FIG. 2C. It is seen that when the negative-going pulses derived from burst A are rectified, the peaks thereof exceed the peaks of the positive-going pulses in both the burst A pulses and the burst B pulses. Hence, when the pulses shown in FIG. 2C are peak detected, the peak-held level derived from the burst A pulses is greater than the peak-held level derived from the burst B pulses. This differential in the detected peaks is interpreted as a tracking error; and even though head 100 is in proper registration with the track (as shown in FIG. 2A), the tracking control servo tends to shift the position of the head to make the detected peaks derived from burst A equal to the detected peaks derived from burst B. As a result, head 100 is shifted from proper registration into misregistration.

Figure 2D:
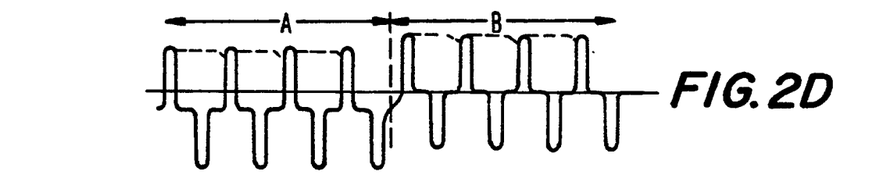
Figure 2E:
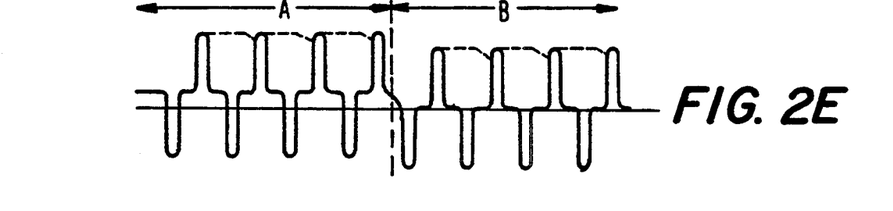

FIG. 2D illustrates the noninverted train of differential pulses produced by head 100 and FIG. 2E illustrates the inverted train of the differential pulses. The pulses illustrated in FIG. 2D are the same as those illustrated in FIG. 2B. Thus, the base line of the inverted pulses derived from burst A is shifted downward relative to the base line of the noninverted pulses derived from burst B. In FIG. 2E, it is seen that the base line of the inverted pulses derived from burst A is shifted upward relative to the base line of the inverted pulses derived from burst B.

Figure 2F:
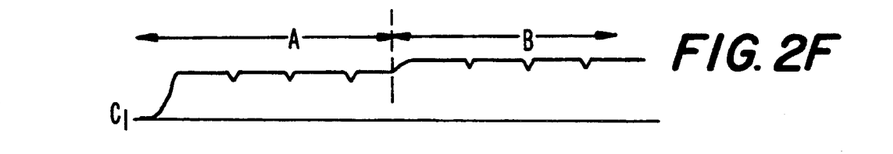
Figure 2G:
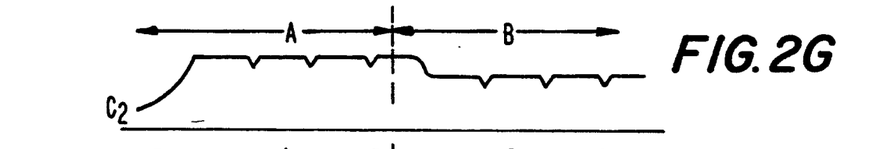

FIG. 2F illustrates the peak-held voltage to which capacitor 103 is charged in response to the positive-going peaks of the noninverted pulses detected by peak detector 10. It is seen that the peak-held voltage derived from the burst A pulses is less than the peak-held voltage derived from the burst B pulses. The ripples in the peak-held voltage levels are caused by the gradual discharge of capacitor 103 and the resetting thereof prior to the detection of the next positive-going pulse peak. Similarly, FIG. 2G illustrates the peak-held voltage produced by capacitor 104 representing the peaks of the positive-going pulses of the inverted pulse train, as detected by peak detector 12. The peak-held voltage waveform shown in FIG. 2G is produced in response to the pulse train illustrated in FIG. 2E. It is seen that the peak-held voltage derived from burst A is greater than the peak-held voltage derived from burst B, as caused by the shift in the base line shown in FIG. 2E because of the residual magnetism in head 100. A comparison of FIGS. 2F and 2G illustrates that the peak-held voltages derived from burst B are equal, but the peak-held voltages derived from burst A differ from each other. This difference is, of course, attributed to the shift in the base line, as shown in FIGS. 2D and 2E.

Figure 2H:
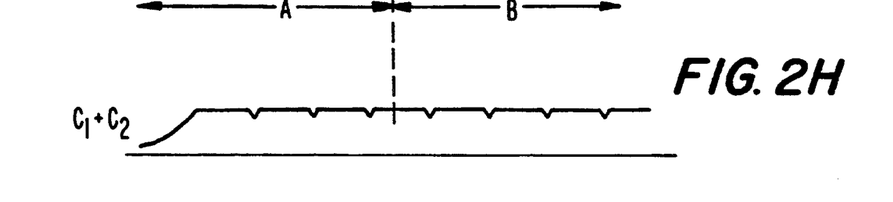

FIG. 2H illustrates the summed peak-held voltages produced by combining circuit 14. In the preferred embodiment, summing resistors 141 and 142 average the peak-held voltages. It is apparent that the summed or averaged peak-held voltages derived from burst A is equal to the summed or averaged peak-held voltages derived from burst B. Thus, even though the peak-held voltages produced by, for example, peak detector 10 in response to the burst A pulses differ from the peak-held voltages derived by this peak detector from the burst B pulses, the summed or averaged peak-held voltages do not exhibit this differential. Samples of the summed or averaged peak-held voltages produced by output circuit 16 are supplied to the microprocessor, and these samples are of equal magnitude, notwithstanding the residual magnetism in head 100. Thus, even though residual magnetism may be present, if head 100 is in proper registration with the track being scanned thereby, a tracking error indication is not falsely produced.

Figure 3A:
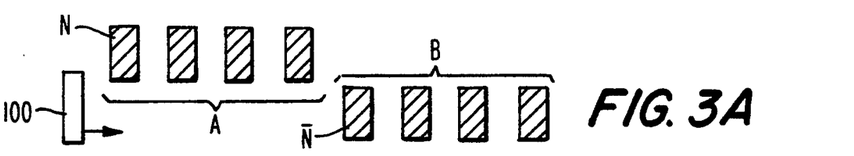
FIGS. 3A-3H are waveform diagrams which also are helpful in understanding the operation of the peak detector shown in FIG. 1.
Figure 3B:
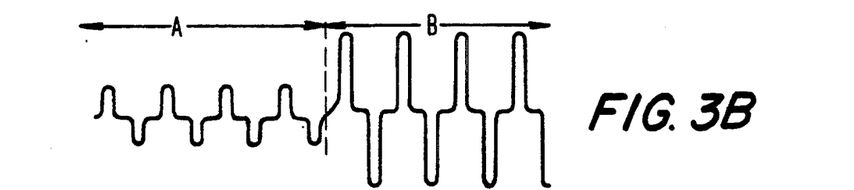

Let it now be assumed that head 100 is misaligned with respect to a track. FIG. 3A illustrates this misregistration of the head; and it is seen that the head is shifted in the downward direction. For the application of the present invention to recover servo pulses, the servo pulses recovered from burst A are of a smaller magnitude than the pulses recovered from burst B. Assuming once again the presence of residual magnetism in head 100, FIG. 3B illustrates the waveform of the pulses recovered from burst A and those recovered from burst B. FIG. 3B further illustrates the base line of the pulses recovered from burst A is shifted downwardly (i.e. in the negative direction) as is caused by the aforementioned residual magnetism.

Figure 3C:
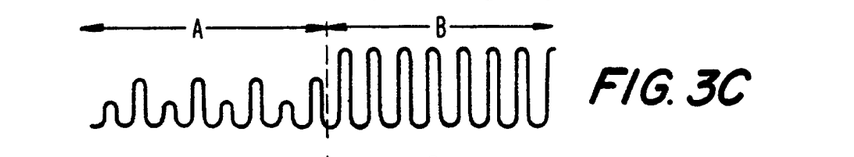
Figure 3D:
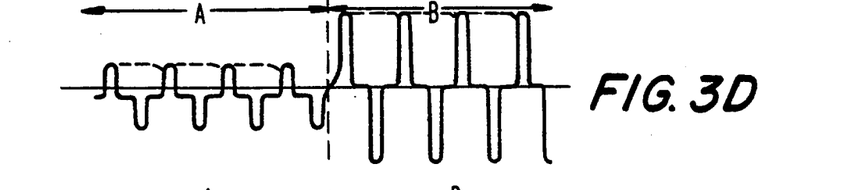
Figure 3E:
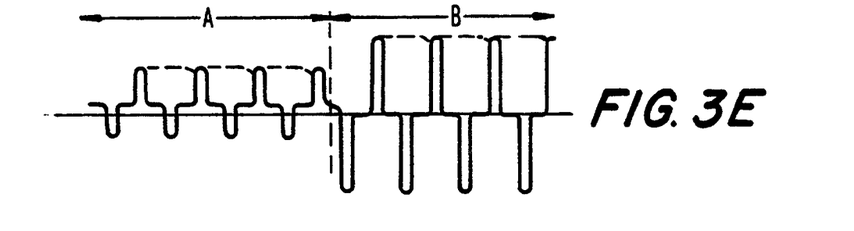

FIG. 3C illustrates the waveform of the pulses recovered from bursts A and B following full wave rectification thereof, as is used by prior art tracking error detectors. It will be seen that the negative-going burst A pulses of FIG. 3B, when rectified, exhibit a greater magnitude than the positive-going burst A pulses, and this is attributed to the downward shifting in the base line of the pulses. In comparison, FIG. 3D illustrates the noninverted pulse train of the differential pulses generated by head 100 and supplied to peak detector 10, and FIG. 3E illustrates the inverted pulse train of the differential pulses supplied by the head to peak detector 12. A comparison of FIG. 3D to aforedescribed FIG. 2D and, likewise, a comparison of FIG. 3E to aforedescribed FIG. 2E, illustrates the results of the misregistration of head 100 relative to the track being scanned thereby. The amplitudes of the noninverted pulse train recovered from burst A are much less than the amplitudes of the noninverted pulse train recovered from burst B. Likewise, the amplitudes of the inverted pulse train recovered from burst A are less than the amplitudes of the inverted pulse train recovered from burst B. FIGS. 3D and 3E also illustrate the voltage to which capacitors 103 and 104 are charged, respectively, in response to the positive peaks detected by peak detectors 10 and 12 from the respective pulse trains supplied thereto by head 100.

Figure 3F:
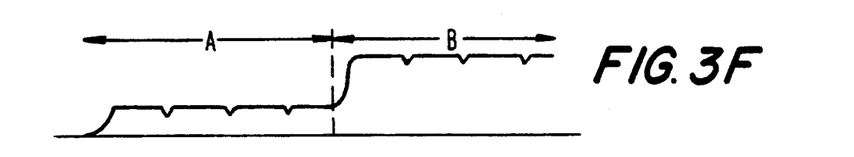
Figure 3G:
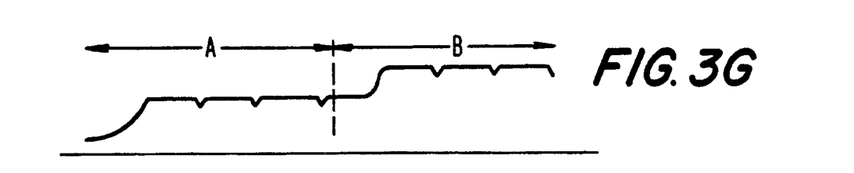
Figure 3H:
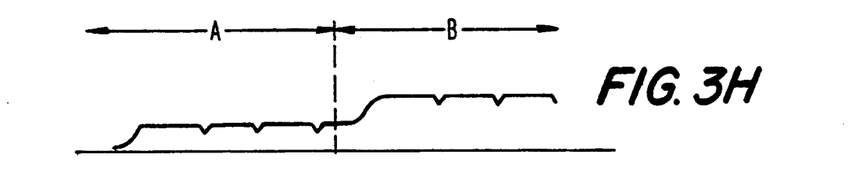

The peak-held voltage to which capacitor 103 is charged is illustrated in FIG. 3F; and the peak-held voltage to which capacitor 104 is charged is illustrated in FIG. 3G. The difference between the peaks of the pulses recovered from burst A and the peaks of the pulses recovered from burst B is readily apparent, even when head 100 exhibits residual magnetism. The peak-held voltages are combined by summing resistors 141 and 142, resulting in the summed, or averaged, peak-held voltage illustrated in FIG. 3H. The effect of the residual magnetism is canceled; and FIG. 3H clearly illustrates the peak-held voltage derived from burst B exceeds the peak-held voltage derived from burst A, thereby indicating a tracking error. The combined peak-held voltages produced by combining circuit 14 are sampled and supplied to other circuitry, such as a microprocessor, for further processing or utilization.

The description set forth hereinabove with respect to FIG. 1 is directed to the peak detecting apparatus of the present invention, whereby pulse levels are detected accurately notwithstanding residual magnetism which may be present in the read head. The following discussion is directed to offset/gain error detector 120 which is supplied with the peak-held voltages stored on capacitors 103 and 104 and which operates to discriminate between an offset error and a gain error in the servo pulse detecting channel.

Figure 4A:
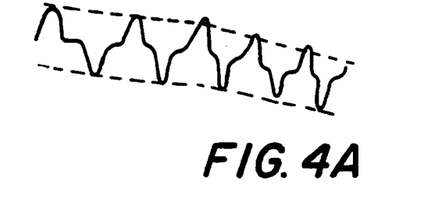
FIGS. 4A-4C are waveform diagrams which are useful in understanding the manner in which the gain/offset error discriminator of the present invention operates to detect an offset error.
Figure 5A:
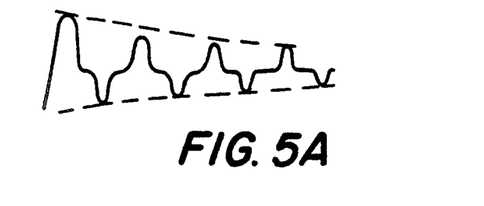
FIGS. 5A-5D are waveform diagrams which are helpful in understanding the manner in which the gain/offset error discriminator of the present invention operates to detect a gain error.

Before describing the structure and operation of the offset/gain error detector, reference is made to FIGS. 4A and 5A which show the pulses that are produced when pulse information, such as a servo burst pattern, is scanned. FIG. 4A illustrates a typical waveform recovered from a servo burst when the read head, such as head 100, initially exhibits an offset. As mentioned previously, an offset may be produced as a result of heat generated during a preceding write operation. FIG. 4A may be thought of as being illustrative of the noninverted pulse train produced by head 100 and supplied to peak detector 10 with an offset. As the AC couple recovers from the applied offset, the positive peak envelope and the negative peak envelope of the pulses shift as illustrated.

The waveform of FIG. 4A is to be contrasted with that of FIG. 5A which illustrates pulses that are recovered by the pulse detecting channel whose gain initially is too high and is adjusted while the pulses are recovered. As the gain of the pulse detecting channel is reduced, the positive peak envelope and negative peak envelope likewise are reduced.

Figure 4B:
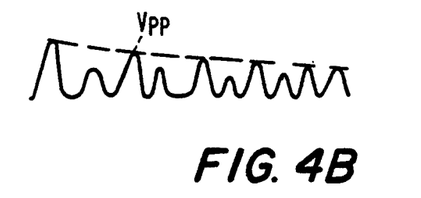
Figure 5B:
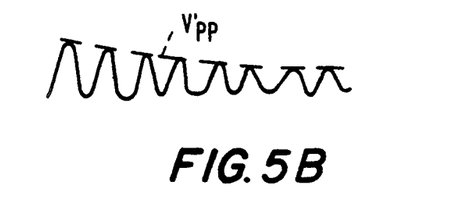

Since the typical pulse detecting channel relies upon full wave rectification of the pulses, FIGS. 4B and 5B illustrate the full wave rectified pulses produced from the waveforms shown in FIGS. 4A and 5A, respectively. Notwithstanding the different shapes of the envelopes of the pulses due to offset error (shown in FIG. 4A) and gain error (shown in FIG. 5A), the envelopes recovered from full wave rectification are substantially similar. Thus, envelope $V_{PP}$ shown in FIG. 4B, produced by peak detecting the full wave rectified pulses resulting from the offset error shown in FIG. 4A, is substantially similar to the envelope $V'_{PP}$ shown in FIG. 5B, produced by peak detecting the full rectified pulses resulting from the gain error shown in FIG. 5A. Consequently, since envelopes $V_{PP}$ and $V'_{PP}$ are substantially the same, it is difficult, if not impossible, to discriminate between an offset error and a gain error.

Figure 4C:
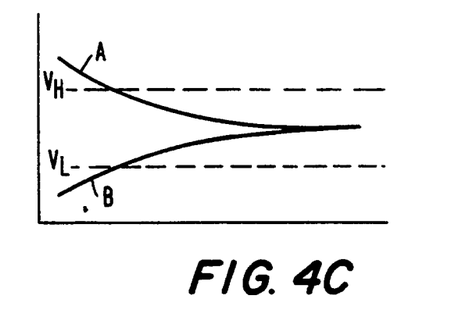

FIG. 4C illustrates the positive peak and negative peak envelopes derived from the peak-held voltages on capacitors 103 and 104. In particular, envelope A is derived from the detected peaks of the noninverted pulse train produced by head 100 and envelope B is derived from the detected peaks of the inverted pulse train produced by the head. Similarly, in FIG. 5C, envelope A' is derived from the detected peaks of the noninverted pulse train of the differential pulses produced by head 100 and envelope B' is derived from the detected peaks of the inverted pulse train and is seen to be substantially the same as envelope A'. A comparison of FIGS. 4C and 5C indicates that, by using the envelopes recovered from the detected peaks of both the noninverted and inverted pulse trains, discrimination between an offset error and a gain error is readily achieved.

Figure 5C:
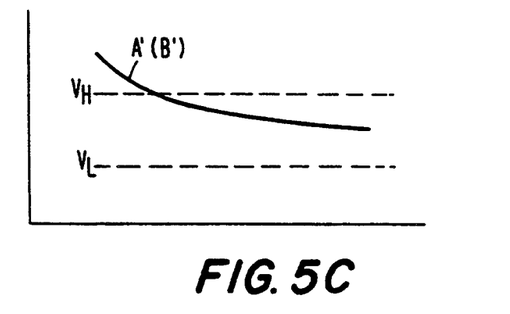

As will be described below, this discrimination is carried out in accordance with the following observation: the waveform of envelope A and the waveform of envelope B are inversely related to each other, that is, they exhibit dissimilar relationships, when an offset error is present, as shown in FIG. 4C, but are substantially identical to each other (A'=B'), that is, they exhibit substantially similar relationships, when a gain error is present, as shown in FIG. 5C. The present invention proceeds by detecting this dissimilar or similar relationship.

Figure 5D:
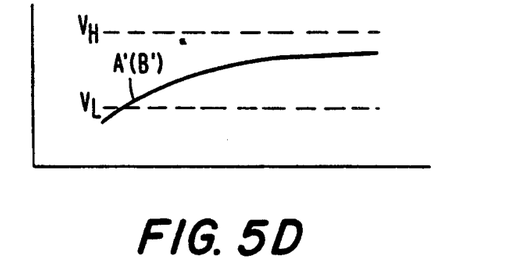

A set of reference levels comprised of relatively high and low threshold levels $V_H$ and $V_L$ are selected, as shown in broken lines in FIGS. 4C and 5C. These threshold levels are such that, in the absence of an error, they will not be crossed or traversed by envelopes A and B (FIG. 4C) or by envelopes A' and B' (FIG. 5C). Consequently, if the magnitude of envelope A derived from the positive peaks of the pulses is greater than the higher threshold level $V_H$ while, at the same time, the envelope B derived from the negative peaks of the pulses is less than the lower threshold level $V_L$, it is concluded that an error in the pulse detecting channel is present and this error is an offset error. However, if the envelope A' derived from the positive peaks of the pulses as well as the envelope B' derived from the negative peaks of the pulses both exceed the higher threshold level $V_H$, as shown in FIG. 5C, or both are less than the lower threshold level $V_L$, as shown in FIG. 5D, it is concluded that an error in the servo pulse detecting channel is present and this error is a gain error. If the envelopes A and B (or A' and B') are disposed between the threshold levels $V_H$ and $V_L$, it is concluded that no error is present.

FIG. 5D illustrates the envelopes A' and B' derived from the positive and negative pulse peaks, respectively, when a gain error is of the type that requires an increase in the gain of the pulse detecting channel. This is in comparison to FIG. 5C which illustrates the envelopes derived from the positive and negative pulse peaks when the gain error in the pulse detecting channel requires a reduction. As the gain increases to correct the gain error, the amplitudes of the pulses likewise increase, as illustrated in FIG. 5D. For the error condition wherein the gain of the read channel must increase, it is seen that both envelopes initially are less than the lower threshold level $V_L$.

Figure 6:
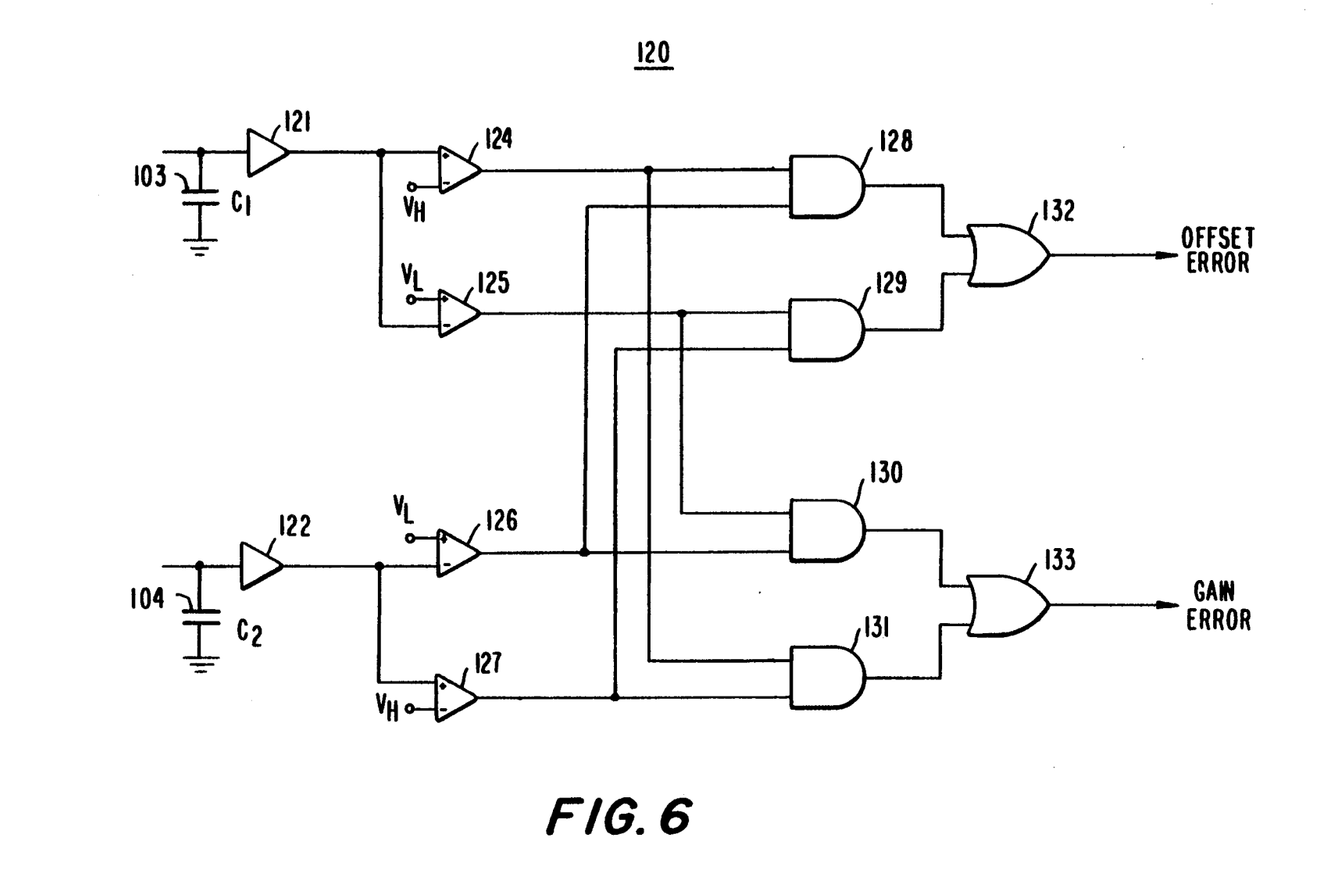
FIG. 6 is a schematic diagram of a preferred embodiment of the gain/offset error discriminator of this invention.

The manner in which the envelopes of the positive and negative peaks of the pulses are derived and detected for the purpose of discriminating between offset and gain error now is described with reference to FIG. 6, which is a schematic diagram of offset/gain error discriminator 120, shown in FIG. 1. This discriminator is comprised of a comparison circuit for comparing the positive peaks of the pulses to the aforementioned set of reference levels, another comparison circuit for comparing the negative peaks of the pulses to these reference levels and a gate array for processing the results of such comparison. More particularly, the peak-held voltage stored on capacitor 103 is proportional to the positive peaks of the noninverted pulses produced by head 100, and this peak-held voltage is coupled in common to comparators 124 and 125 by way of a buffer 121. Similarly, the peak-held voltage stored on capacitor 104 is proportional to the positive peaks of the inverted pulses produced by head 100, and this is related to the negative peaks of the noninverted pulses as shown in, for example, FIG. 2E. In accordance with the desired operation of this aspect of the present invention, the peak-held voltage corresponding to the negative peaks of the pulses, that is, the peak-held voltage stored on capacitor 104, is coupled by a buffer 122 to comparators 126 and 127.

Comparator 124 is adapted to sense when the positive peaks of the pulses exceed the higher threshold voltage $V_H$, and includes a noninverting input coupled to receive the positive peaks and an inverting input coupled to receive the higher threshold voltage $V_H$. Comparator 125 is adapted to sense when the positive peaks of the pulses are less than the lower threshold voltage $V_L$ and includes a noninverting input coupled to receive the lower threshold level $V_L$ and an inverting input coupled to receive the positive peaks of the pulses.

Comparator 126 is adapted to sense when the negative peaks of the pulses are less than the lower threshold voltage $V_L$ and includes a noninverting input coupled to receive the lower threshold voltage $V_L$ and an inverting input coupled to buffer 122 to receive the negative peaks of the pulses. Comparator 127 is adapted to sense when the negative peaks of the pulses exceed the higher threshold voltage $V_H$ and includes a noninverting input coupled to buffer 122 to receive the negative peaks of the pulses and an inverting input coupled to receive the higher threshold voltage $V_H$.

The gate array is comprised of AND gates 128-131 and OR gates 132 and 133. AND gate 128 is adapted to detect when the positive peaks of the pulses exceed the higher threshold level $V_H$ and the negative peaks of the pulses are less than the lower threshold level $V_L$. Accordingly, AND gate 128 is coupled to the outputs of comparators 124 and 126.

It is appreciated, from FIG. 1, that since differential pulses are supplied to peak detectors 10 and 12, it is just as likely for peak detector 12 to be supplied with the noninverted pulse train as it is for peak detector 10 to be supplied with this noninverted pulse train. Consequently, the peak-held voltage stored in capacitor 103 may be less than the lower threshold level $V_L$ at the same time that the peak-held voltage stored on capacitor 104 exceeds the higher threshold voltage $V_H$. Accordingly, AND gate 129 is coupled to the outputs of comparators 125 and 127 to sense this condition, that is, to detect when the peak-held voltage stored on capacitor 103 is less than the lower threshold level $V_L$ and the inverted peak-held voltage stored on capacitor 104 exceeds the higher threshold level $V_H$. OR gate 132 is coupled to AND gates 128 and 129 to produce an offset error indication when either AND gate is supplied with coinciding signals.

AND gate 130 is coupled to the outputs of comparators 125 and 126 and is adapted to sense when the positive peaks as well as the negative peaks of the pulses both are less than the lower threshold level $V_L$. AND gate 131 is coupled to comparators 124 and 127 and is adapted to sense when the positive peaks and the negative peaks of the pulses both exceed the higher threshold level $V_H$. OR gate 133 is coupled to AND gates 130 and 131 and is adapted to produce a gain error indication when either of these AND gates is supplied with coinciding signals.

The manner in which offset/gain error discriminator 120 operates now will be discussed in conjunction with the waveforms shown in FIGS. 4 and 5. Let it be assumed that an offset error is present and that one of the trains of pulses produced by head 100, such as, for example, servo pulses, appears as shown in FIG. 4A. From the foregoing description, it is recalled that capacitor 103 stores a peak-held voltage derived from the positive-going peaks of the noninverted pulse train and capacitor 104 stores the peak-held voltage derived from the positive-going peaks of the inverted pulse train. Under ideal conditions, the peak-held voltage stored on capacitor 103 is substantially equal to the peak-held voltage stored on capacitor 104.

The present example has assumed the presence of an offset error and, therefore, the peak-held voltage supplied to comparators 124 and 125 corresponds to envelope A, shown in FIG. 4C, and the peak-held voltage supplied to comparators 126 and 127 is illustrated as envelope B. These envelopes exhibit dissimilar relationships with respect to the higher and lower threshold levels. Comparator 124 produces a positive output signal when envelope A, supplied by capacitor 103, exceeds threshold level $V_H$. Likewise, comparator 126 produces a positive signal when envelope B, supplied from capacitor 104, is less than the lower threshold level $V_L$. AND gate 128 senses the coincidence of the positive output signals produced by comparators 124 and 126; and an offset error indication is produced by OR gate 132.

When envelope A exceeds the high threshold level $V_H$, comparator 125 produces a low or negative output signal which inhibits AND gate 130. Likewise, when envelope B is less than the lower threshold level $V_L$, comparator 127 produces a low or negative output signal to inhibit AND gate 131. Consequently, a gain error indication is not provided.

Now, let it be assumed that a gain error is present, resulting in pulse trains having the waveform shown in FIG. 5A. Assuming that this gain error begins as a high gain and is corrected by reducing its level, the peak-held voltage stored on capacitor 103 may appear as indicated by envelope A' in FIG. 5C and the peak-held voltage stored on capacitor 104 may appear as the envelope B' in FIG. 5C. Envelope B' is substantially similar to envelope A', as shown in FIG. 5C Comparator 124 produces a positive output signal when envelope A' exceeds the higher threshold level $V_H$ and comparator 127 likewise produces a positive output signal when inverted envelope B' exceeds the higher threshold level. AND gate 131 senses the coinciding positive output signals produced by comparators 124 and 127; and OR gate 133 produces a gain error indication.

Alternatively, let it be assumed that the gain error in the pulse detecting channel is present as a low gain, which thereafter is corrected by increasing its level. With this condition, the peak-held voltage stored on capacitor 103 appears as envelope A' in FIG. 5D, and the peak-held voltage stored on capacitor 104 appears as envelope B', also shown in FIG. 5D. Now, envelope B' and envelope A' are seen to exhibit substantially similar relationships with respect to the threshold levels. Comparator 125 produces a positive output signal when envelope A' is less than the lower threshold voltage $V_L$, and comparator 126 likewise produces a positive output signal when envelope B' is less than the lower threshold level. AND gate 130 senses the coinciding positive output signals produced by comparators 125 and 126; and OR gate 133 produces a gain error indication.

Thus, it is seen that, when the positive and negative peaks derived from the reproduced pulses exhibit a substantially similar relationship with respect to the set of reference levels $V_H$ and $V_L$, a gain error is indicated. However, if the positive and negative peaks exhibit dissimilar relationships with respect to the reference levels $V_H$ and $V_L$, an offset error is indicated. The ambiguity associated with prior art error discriminators thus is avoided.

While the present invention has been particularly shown and described with reference to preferred embodiments, it will be readily appreciated by those of ordinary skill in the art that various changes and modifications may be made without departing from the spirit and scope of the invention. It is intended that the appended claims be interpreted as covering the embodiments described herein and all equivalents thereto.

What is claimed is:

1. Apparatus for peak detecting pulses recovered from a magnetic disk by a magnetic head, said apparatus comprising:

input means for concurrently supplying non-full-wave rectified first and second trains of differential pulses recovered from the same track by said magnetic head, said first non-full-wave rectified train of differential pulses exhibiting a baseline shift relative to said second non-full-wave rectified train of differential pulses as a result of asymmetric residual magnetism of said magnetic head;

first and second peak detecting means connected to said input means for detecting peaks of said first and second non-full-wave rectified trains of baseline-shifted differential pulses, respectively;

adding means for adding the peaks detected in said first non-full-wave rectified train of differential pulses with the peaks detected in said second non-full-wave rectified train of differential pulses; and output means for providing an output signal indicative of pulse peaks as a function of the added peaks.

2. The apparatus of claim 1 wherein said adding means comprises averaging means for averaging the peaks detected in said first train of differential pulses and the peaks detected in said second train of differential pulses.

3. The apparatus of claim 1 wherein said adding means comprises summing means for summing the peaks detected in said first train of differential pulses with the peaks detected in said second train of differential pulses.

4. The apparatus of claim 1 wherein said magnetic head comprises a differential head for concurrently producing first and second trains of noninverted and inverted pulses, respectively, the noninverted and inverted pulses exhibiting a baseline shift relative to each other; and said input means comprises means for receiving the noninverted and inverted pulses as the respective first and second trains of differential pulses.

5. The apparatus of claim 1 wherein said output means comprises sampling means for sampling the added peaks to produce said output signal.

6. The apparatus of claim 1, wherein said input means concurrently supplies third and fourth non-full-wave rectified trains of non-baseline-shifted differential pulses sequentially after said concurrently supplied first and second non-full-wave rectified trains of baseline-shifted differential pulses, said first, second, third and fourth trains of differential pulses being recovered by the same magnetic head from respective bursts of magnetic domain recorded in the same track on said magnetic disk, the respective bursts being offset relative to a center line of the track.

7. The apparatus of claim 6, wherein said magnetic head comprises a differential head for concurrently producing first and second trains of noninverted and inverted pulses, respectively, and for concurrently producing third and fourth trains of noninverted and inverted pulses, respectively, the first and second trains of noninverted and inverted pulses exhibiting a baseline shift to each other, and the third and fourth trains of noninverted and inverted pulses not exhibiting a baseline shift to each other; and said input means comprises means for receiving the first and second trains of noninverted and inverted pulses as the respective first and second trains of differential pulses and for receiving the third and fourth trains of noninverted and inverted pulses as the respective third and fourth trains of differential pulses.

8. Apparatus for peak detecting pulses recovered from a magnetic disk by a magnetic head said apparatus comprising:

input means for supplying non-full-wave rectified first and second trains of noninverted and inverted differential pulses, respectively, recovered by said magnetic head comprising a differential head for concurrently producing said noninverted and inverted pulses, said noninverted and inverted pulses exhibiting a baseline shift relative to each other as a result of asymmetric residual magnetism of said magnetic head;

first and second peak detecting means connected to said input means for detecting peaks of said first and second non-full-wave rectified trains of baseline-shifted noninverted and inverted differential pulses, respectively, each of said first and second peak detecting means comprising differential amplifier means supplied with said noninverted and inverted pulses, capacitor means for storing an output voltage produced by said differential amplifier means, and transistor means for coupling said capacitor means to said differential amplifier means to store peak levels of said output voltage such that the capacitor means of said first peak detecting means stores peaks of said noninverted pulses and the capacitor means of said second peak detecting means stores peaks of said inverted pulses;

adding means for adding the peaks detected in said first non-full-wave rectified train of noninverted pulses with the peaks detected in said second non-full-wave rectified train of inverted pulses; and output means for providing an output signal indicative of pulse peaks as a function of the added peaks.

9. The apparatus of claim 8 wherein said adding means comprises resistive summing means coupled to each of said capacitor means for averaging the stored peaks of the noninverted and inverted pulses and filtering noise.

10. The apparatus of claim 8 wherein each of said first and second peak detecting means further comprises reset means for resetting the capacitor means of said first peak detecting means in response to a next-following non-inverted pulse and for resetting the capacitor means of said second peak detecting means in response to a next-following inverted pulse.

11. The apparatus of claim 10 wherein said reset means comprises first reset switch means coupled to the capacitor means of said first peak detecting means and activated in response to the next-following non-inverted pulse, and second reset switch means coupled to the capacitor means of said second peak detecting means and activated in response to the next-following inverted pulse.

12. The apparatus of claim 11 wherein said reset means further comprises delay means coupled to said first and second reset switch means for enabling said first and second reset switch means a predetermined delay time after peak levels are stored in the absence of pulses produced by said differential head.

13. The apparatus of claim 12 wherein said first and second reset switch means comprise first and second reset transistor means, respectively, and said delay means comprises a delay capacitor, said first reset transistor means having a collector-emitter circuit for coupling the capacitor means of said first peak detecting means to said delay capacitor and said second reset transistor means having a collector-emitter circuit for coupling the capacitor means of said second peak detecting means to said delay capacitor 14. The apparatus of claim 13 wherein said reset means additionally comprises a current source connected in series with the collector-emitter circuits of said first and second reset transistor means.

15. Apparatus for peak detecting pulses recovered from a magnetic disk by a magnetic head, said apparatus comprising:

input means for sequentially supplying first and second pairs of non-full-wave rectified trains of differential pulses recovered by said magnetic head from first and second trains of differential pulses, respectively, recorded in a track and physically offset from one another on said track, each of said first and second pairs of non-full-wave rectified trains of differential pulses having a first train and a second train of differential pulses, said first train of said first pair exhibiting a baseline shift relative to the second train of said first pair as a result of asymmetric residual magnetism of said magnetic head;

first and second peak detecting means connected to said input means for detecting peaks of said first and second trains, respectively, of one of said first and second pairs of non-full-wave rectified trains and supplying a first detected peak and a second detected peak as respective outputs;

adding means for adding said first detected peak with said second detected peak; and output means for providing an output signal indicative of pulse peaks as a function of the added peaks.

16. The apparatus of claim 15, wherein said adding means comprises averaging means for averaging the first detected peak and the second detected peak.

17. The apparatus of claim 15, wherein said adding means comprises summing means for summing the first detected peak with the second detected peak.

18. The apparatus of claim 15, wherein said magnetic head comprises a differential head for concurrently producing first and second trains of noninverted and inverted pulses, respectively; and said input means comprises means for receiving the noninverted and inverted pulses as the respective first and second trains of one of said first and second pairs of non-full-wave rectified trains.

19. The apparatus of claim 15, wherein said input means concurrently supplies said first and second trains of said first pair of non-full-wave rectified trains and concurrently supplies said first and second trains of said second pair of non-full-wave rectified trains.

* * * * *